US012311250B1

(12) United States Patent
Keegan

(10) Patent No.: US 12,311,250 B1
(45) Date of Patent: May 27, 2025

(54) APPARATUS FOR TRANSPORT AND STORAGE OF SPORTING EQUIPMENT

(71) Applicant: Charles H Keegan, Milton, MA (US)

(72) Inventor: Charles H Keegan, Milton, MA (US)

( * ) Notice: Subject to any disclaimer, the term of this patent is extended or adjusted under 35 U.S.C. 154(b) by 382 days.

(21) Appl. No.: 18/155,014

(22) Filed: Jan. 16, 2023

Related U.S. Application Data

(60) Provisional application No. 63/301,701, filed on Jan. 21, 2022.

(51) Int. Cl.
*A63C 11/02* (2006.01)
*B62B 1/12* (2006.01)
*B62B 1/26* (2006.01)

(52) U.S. Cl.
CPC .............. *A63C 11/026* (2013.01); *B62B 1/12* (2013.01); *B62B 1/262* (2013.01); *B62B 1/266* (2013.01); *B62B 1/268* (2013.01); *B62B 2202/401* (2013.01); *B62B 2205/003* (2013.01)

(58) Field of Classification Search
CPC ......... A63C 11/026; B62B 1/12; B62B 1/262; B62B 1/266; B62B 1/268; B62B 2202/401; B62B 2205/003
See application file for complete search history.

(56) References Cited

U.S. PATENT DOCUMENTS 5,586,778 A * 12/1996 Lindh .................... A63B 55/60
280/DIG. 6
10,279,241 B1 * 5/2019 Lurie ...................... B62B 1/008
11,813,516 B2 * 11/2023 Keegan ................ A63C 11/026

* cited by examiner

*Primary Examiner* — Bryan A Evans

(57) ABSTRACT

An apparatus for transport and storage of sporting equipment such as skis has a wheeled caddy, gear bag and a tray.

7 Claims, 16 Drawing Sheets

100

100

100

200

200

APPARATUS FOR TRANSPORT AND STORAGE OF SPORTING EQUIPMENT

TECHNICAL FIELD

The present disclosure relates to a wheeled caddy for transport and storage of sporting equipment such as skis. Classifications might include A63C11/026—Carrying-devices for skis or ski-sticks on wheels and B62B1/262—Hand carts having only one axis carrying one or more transport wheels; Equipment therefor characterized by supports specially adapted to objects of definite shape, the objects being of elongated shape, e.g. fishing rods, golf clubs. The present disclosure relates more particularly to a wheeled caddy for transport and storage of skis.

BACKGROUND

Hand carts for carrying ski and snowboard equipment are known in the art. These purport to carry snowboards, skis and ski equipment, such as poles and boots, on wheeled caddies.

Methods and apparatuses for folding a wheeled apparatus for sports equipment are known in the art; they include various linkage and hinged mechanisms and motions, including sliding, pivoting, nesting and the like.

SUMMARY

An apparatus for transport and storage of sporting equipment consists of a wheeled caddy and a mounting apparatus for storing and transporting ski equipment, as well as an equipment bag and an associated tray. The apparatus enables the transport, storage and locking of sporting equipment such as skis, snowboards, poles, boots and other sporting equipment, folding easily for storage.

The wheeled caddy enables transport from car to ski area and back. Its upper and lower structures support skis, poles or snowboards, and are connected by hinges and a catch to a central frame structure. The caddy's central frame structure has a telescoping mechanism for extending and collapsing the length of the central frame structure. The central frame structure also has a foldable handle and two foldable struts that support two wheels.

The lower structure is a pair of linear members through which skis or snowboards may be slid and fastened. The upper structure is a linear member for supporting the upper end of skis or snowboards. A support leg slides out of the central structure to create, together with the two wheels, a three-legged standing caddy. A storage bag hooks to the apparatus in the rear region of the apparatus, and is designed to hold other ski equipment. Additional hooks in the front area of the apparatus hold other equipment and help balance the apparatus during use. With the foldable handle pivoted up approximately parallel to the ground, an attached tray can be supported on it.

The handle, upper structure, lower structure, struts and wheels may be folded against the central structure for storage and transport. The bag and tray are removed for storage and transport.

DESCRIPTION

Figure 1:
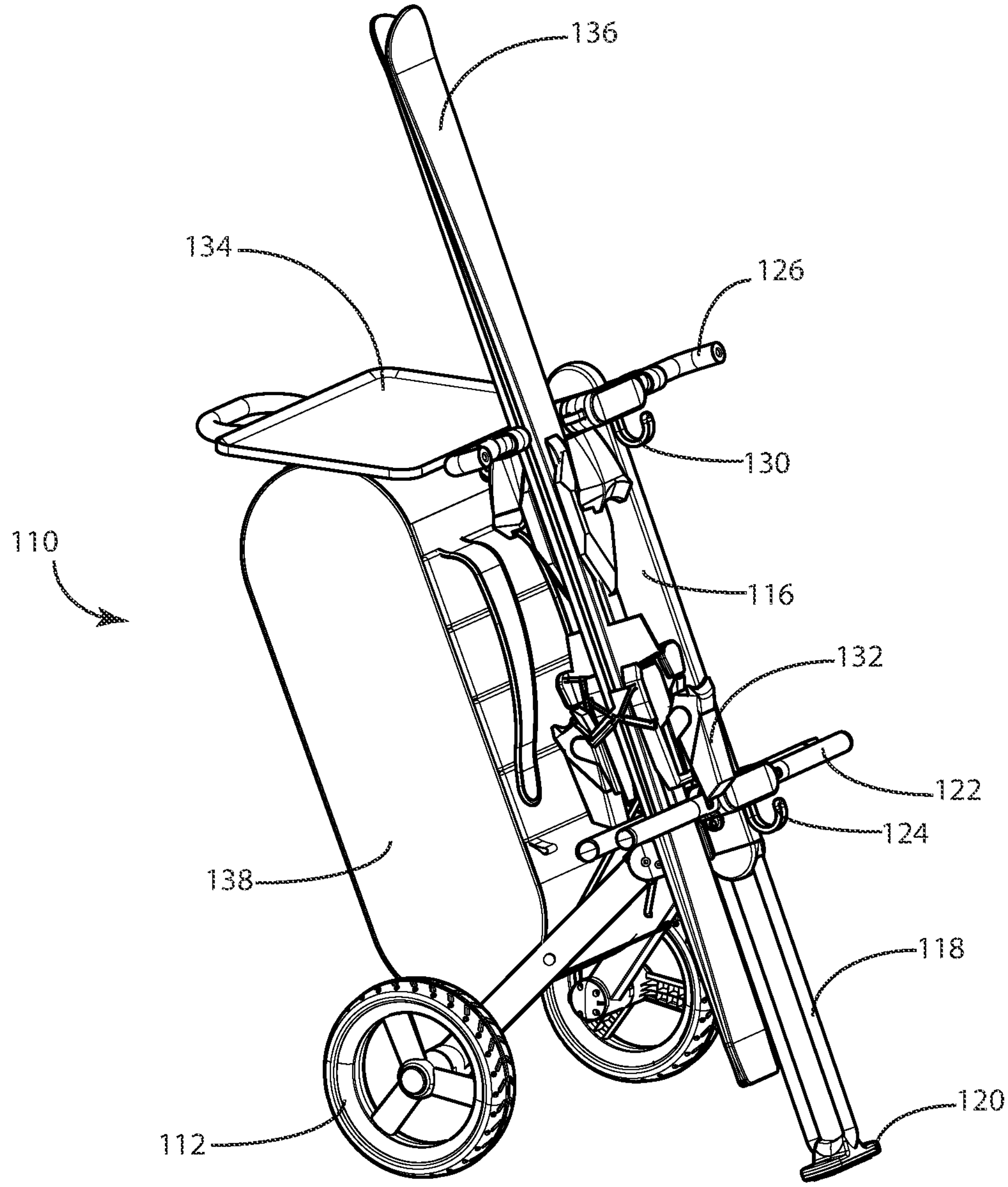
FIG. 1 is a front perspective view of an example embodiment.
Figure 2:
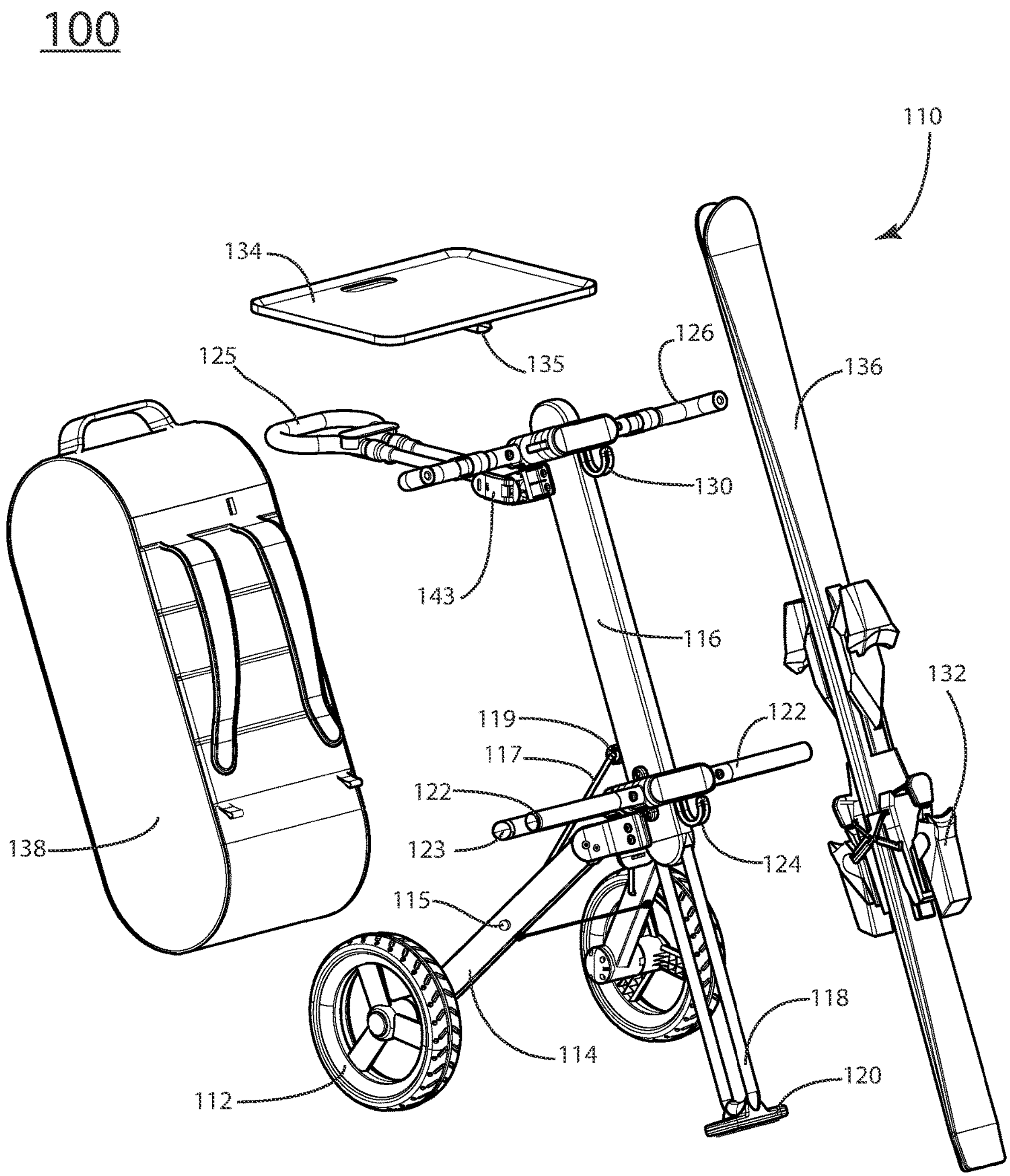
FIG. 2 is a partially exploded view of the embodiment of FIG. 1.
Figure 3:
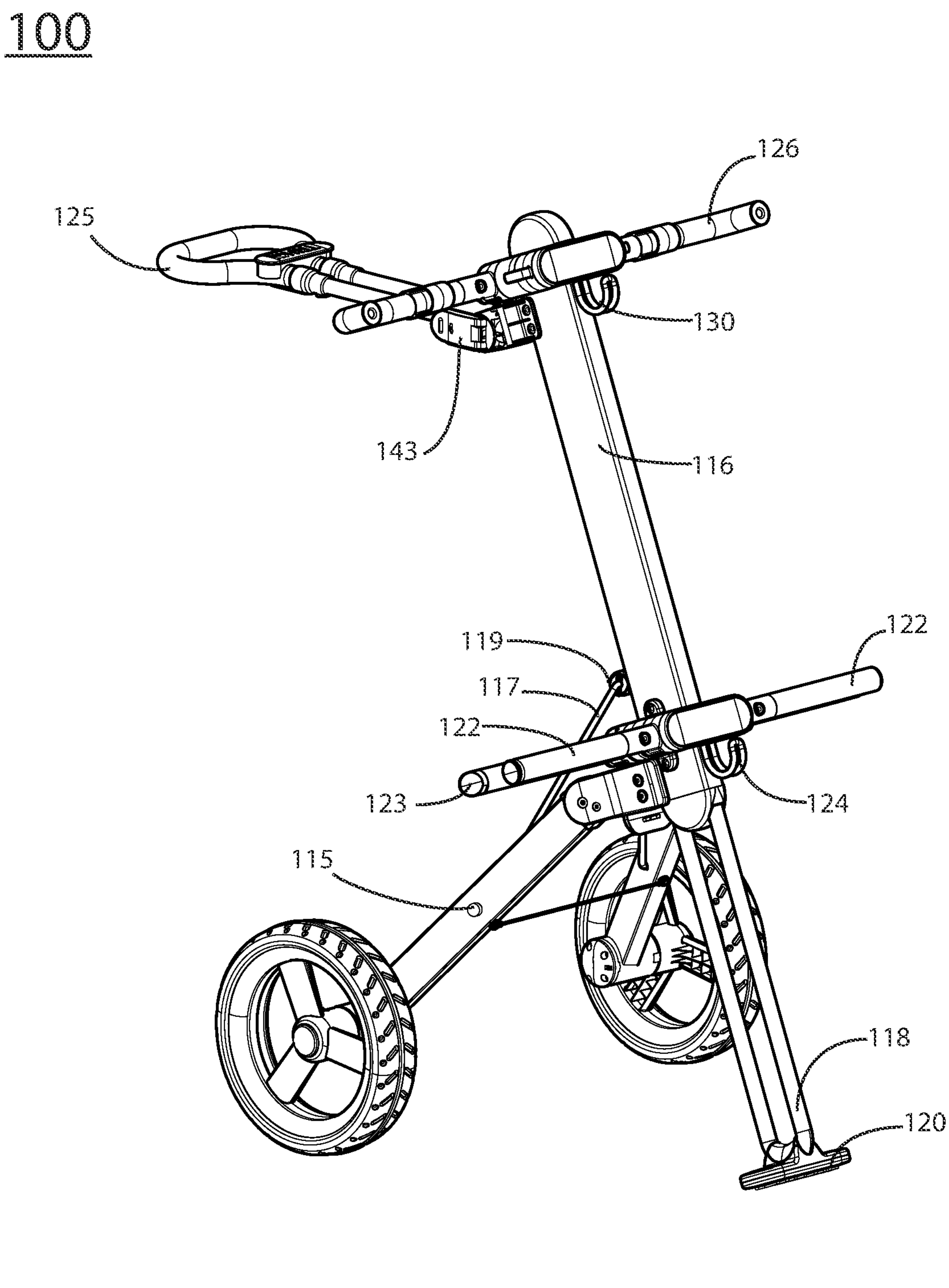
FIG. 3 is a front perspective view of the wheeled cart of the embodiment.

FIGS. 1, 2 and 3 show perspective views of an example embodiment 100. A cart 110 is configured to carry a number of sets of skis 136 and to support a gear bag 138 for holding boots and other sports gear, and further to support a tray 134. A set of skis 136 is shown for demonstration purposes; one skilled in the art understands that ski poles, skis or snowboards may be carried in the same manner as a set of skis.

A cart 110 has a hollow central support structure 116 that receives a lower sliding support 118. The central support structure 116 has upper horizontal support structures 126 and paired lower horizontal structures 122 and 123, also referred to as ski braces. In some embodiments, a set of bindings 132 rests atop the ski braces 122 and 123, with the skis 136 residing between them. One skilled in the art understands how a snowboard may be carried in a similar manner.

Figure 4:
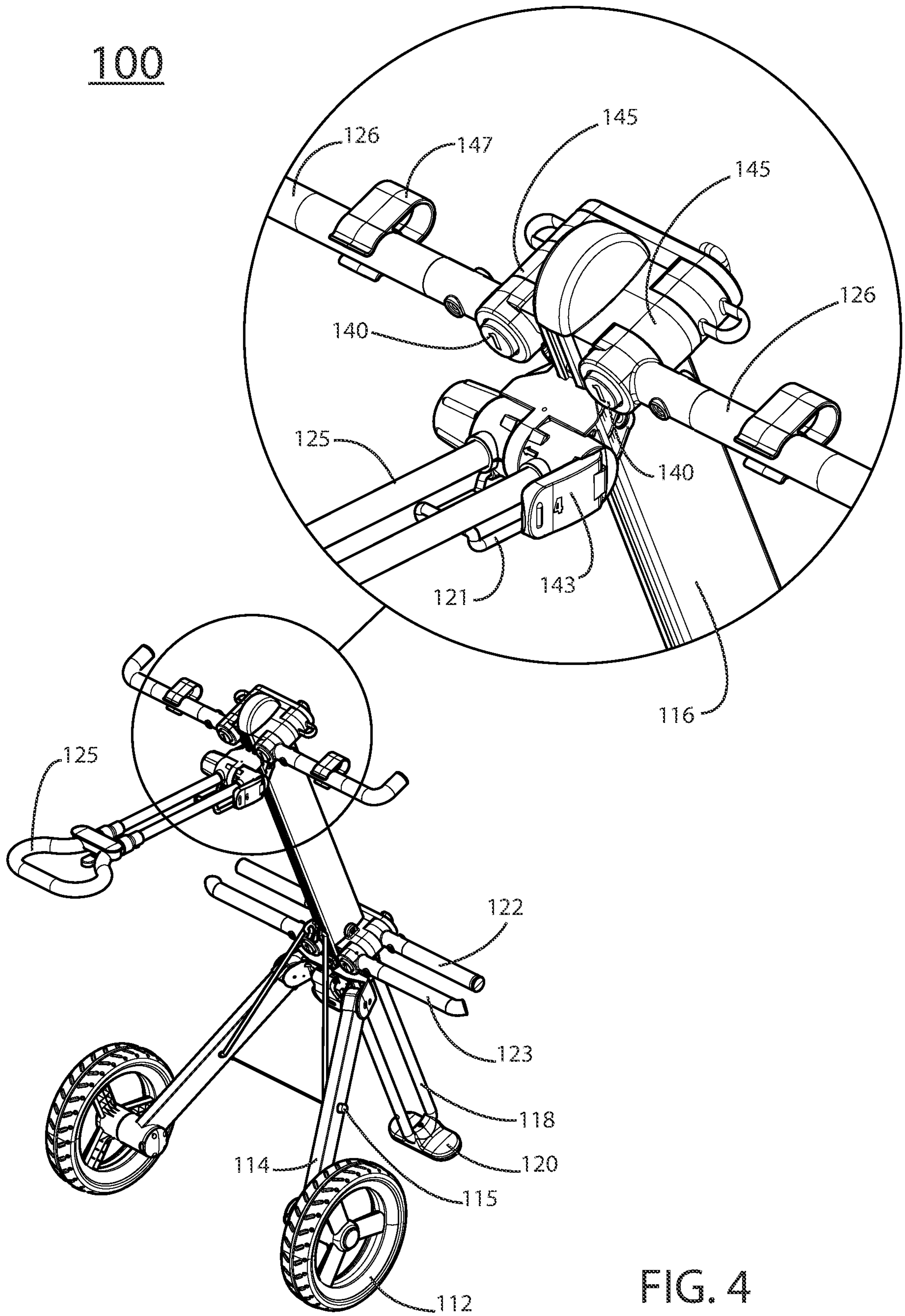
FIG. 4 is a perspective, detail view of the upper assembly thereof.
Figure 5:
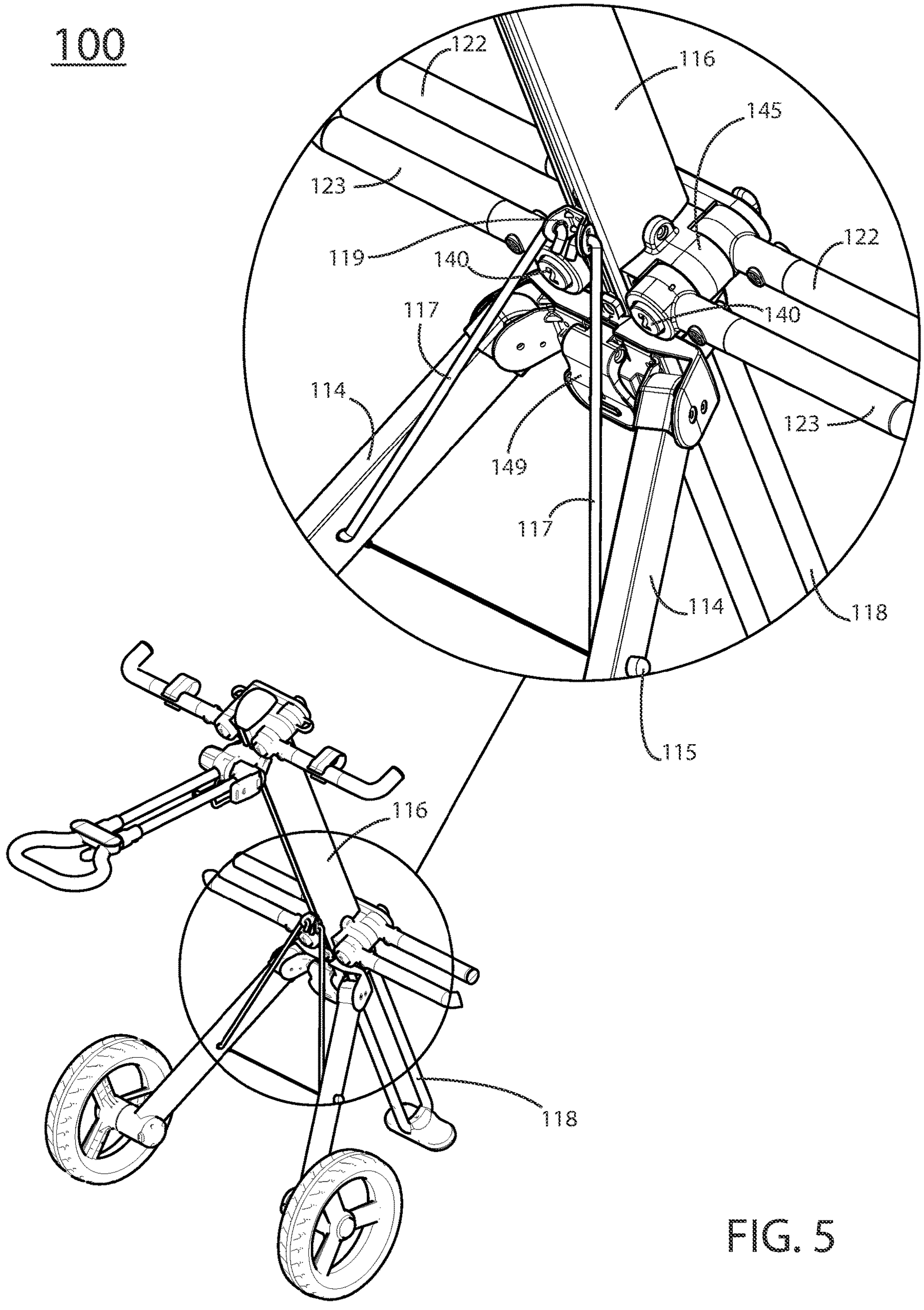
FIG. 5 is a perspective, detail view of the lower assembly thereof.

The ski braces comprise a front 122 and rear brace 123 and are joined where they meet the central support structure 116 (FIG. 5). The central support structure 116 has at its distal end a folding handle 125, a rearward bag-hook 121 (FIG. 4), a forward upper hook 130, and a forward lower hook 124 (FIG. 2). The rearward bag-hook 121 is configured to carry a gear bag 138. The tray 134 rests on the folding handle 125 (FIG. 2) as shown in FIGS. 1 and 2 and is further joined to the cart 110 by stabilizing clip 135. One skilled in the art is familiar with stabilizing clips, tabs and the like.

Wheels 112 are connected to struts 114 which pivot about the central structure 116. Struts are connected to support-linkage arms 117 which pivot at a support-linkage pivot point 115. Another linkage pivot 119 is affixed to lower sliding support 118. The lower sliding support slides into the central structure 116. A stop 120 is disposed at the proximal end of the lower sliding support 118.

One skilled in the art is familiar with such linkage structures as well as the action of a lower sliding support 118 into the central structure 116 as it moves support-linkage arms 117 to cause struts 114 to fold against the central structure 116.

FIG. 4 shows the upper assembly in detailed view. The central structure 116 supports locking pivot mechanisms 145 that are held fast to the central support. Upper horizontal support structures 126 pivot about the locking pivot mechanisms 145 for folding. The rearward hook 121 is joined to the folding arm 125. One skilled in the art is familiar with fixtures and brackets that affix to the end of formed tubing such as that which makes up folding arm 125, for the purpose of finishing ends and joining hardware and other features such as rearward hook 121 to the formed tubing. Spacers 147 provide a means of keeping skis separated during transport. Release buttons 140 release locking pivot mechanisms 145 to fold upper horizontal support structures 126. The detail feature and function of the release button 140 is depicted in FIG. 6.

Figure 6:
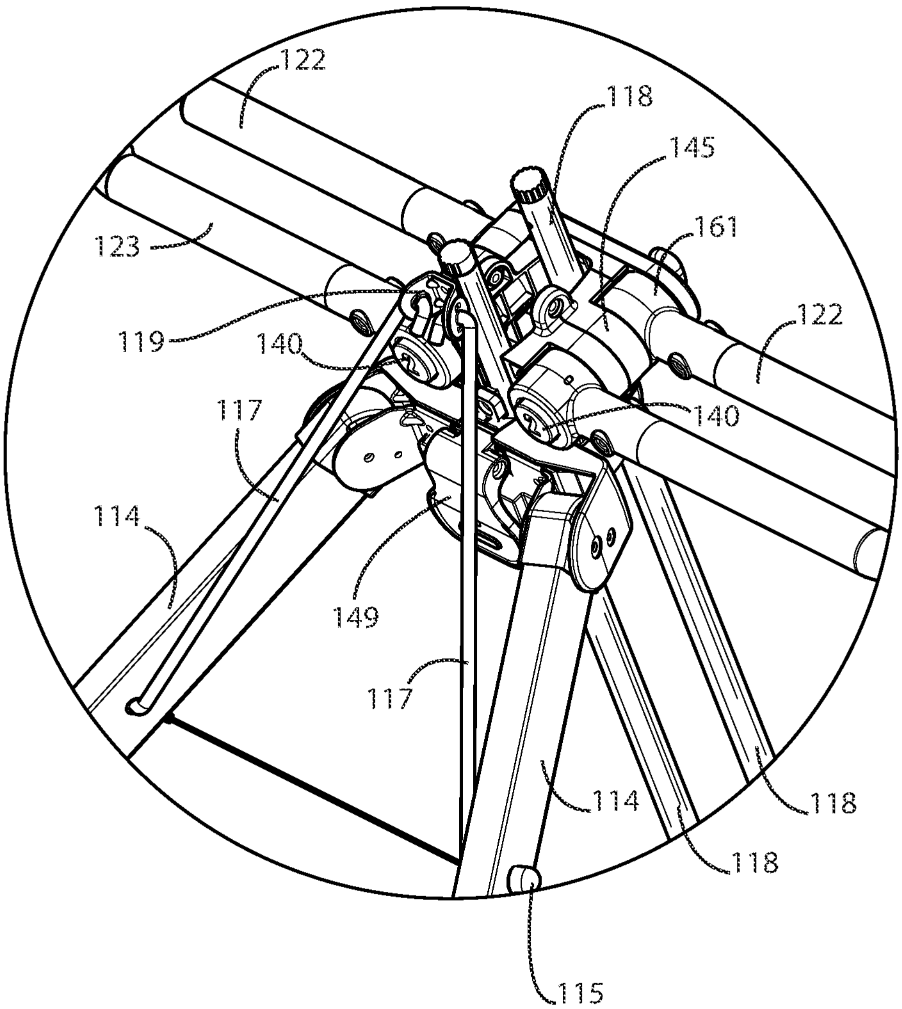
FIG. 6 is another perspective, detail view of the lower assembly thereof.

FIG. 5 and FIG. 6 show a partial lower assembly in detail view. The lower sliding support 118 slides into the central structure 116. Support-linkage arms 117 pivot in linkage pivot 119 which is in turn affixed to lower sliding support 118 and is further joined to struts 114 that support wheels 112 at a support linkage pivot point 115. As with the upper section, sliding the sliding support 118 into the central structure 116 will move support-linkage arms 117 to cause struts 114 to fold against the central structure 116. As with the upper assembly, the paired lower braces 122, 123 are affixed to a locking pivoting mechanism 145. Forward lower brace 122 is joined to fixture 161. By depressing a button 140, the locking pivoting mechanism 145 may be released to allow paired lower braces 122, 123 to fold against the central structure 116. A locking lever 149 fastens the lower sliding support 118 against the central structure 116. Releasing the locking lever 149 allows the lower sliding support 118 to slide inside the central structure 116. FIG. 5 shows the lower assembly with the central structure 116 removed to show the connection between the linkage pivot 119 and the lower sliding support 118.

Figure 7:
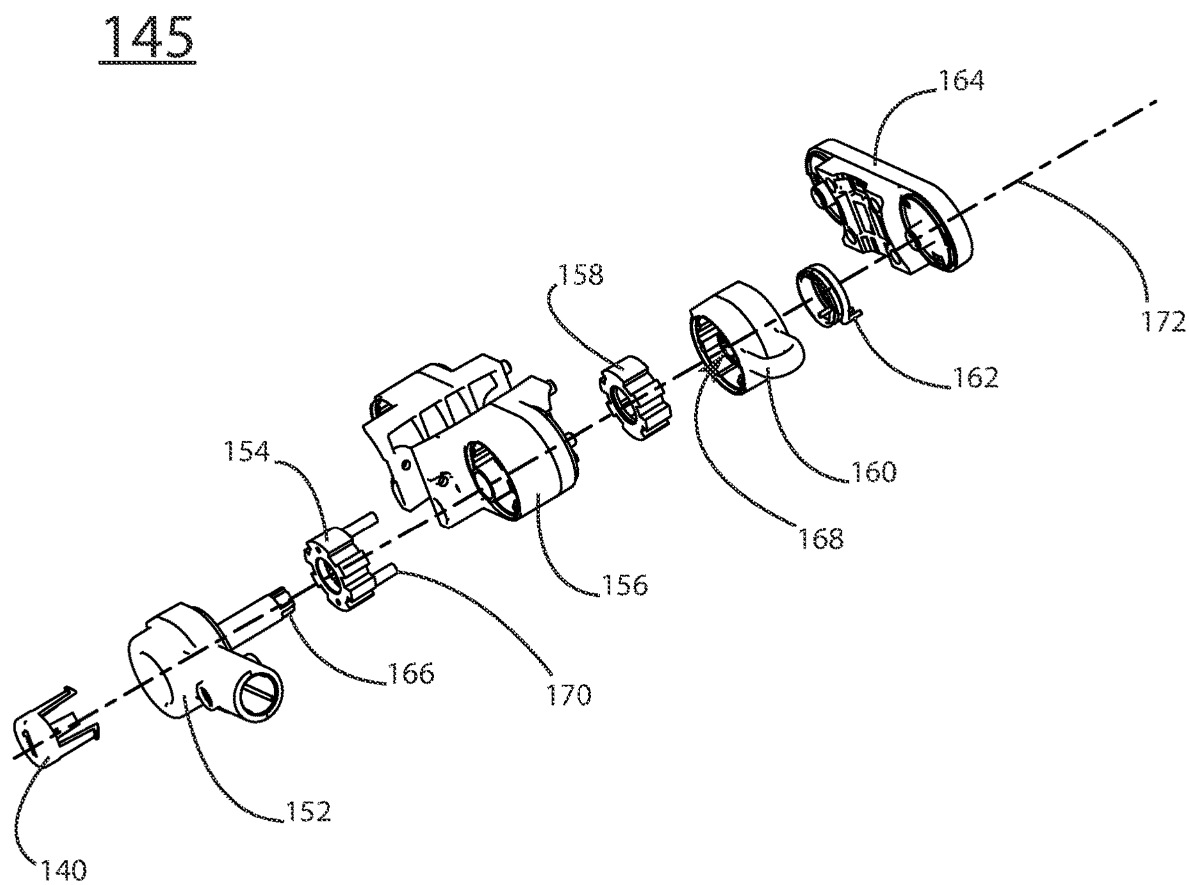
FIG. 7 is a perspective, exploded view of the locking pivot mechanism.

FIG. 7 shows the locking pivot mechanism 145 in exploded view. One skilled in the art understands that the upper and lower locking pivot mechanisms each have identical components and function. The upper locking pivot mechanism 145 is shown. Fixture 161 joins with forward support 122 in the lower assembly (FIG. 6). The upper assembly does not join with a forward support such as forward support 122 (FIG. 7) and instead, has a utility hook on the fixture 160/161 in the upper assembly (FIG. 7). Fixture 152 joins with rearward support 123 in the lower assembly, and with horizontal support 126 (FIG. 4) in the upper assembly. Fixture 152 has a splined end 166 that mates with a splined receptacle 168 such that fixtures 152 and 160/161 rotate concurrently. The release button 140 rests against a first gear 154. Posts 170 extend to a second gear 158. Movement of the button 140 moves the first gear 154 and second gear 158 to free the gears from cogs in fixture 152, 156 and 160 to allow fixture 152 and 160 to pivot about the centerline 172. A torsion spring 162 is affixed at a first end to fixture 160 and at a second end to housing 164 which is in turn affixed to central structure 116 (not shown). The torsion spring 162 is torqued when rotating fixtures 152 and 160 to their horizontal orientations, such that torsion spring 162 holds the supports 126, 122, 123 in their folded orientations.

Figure 8:
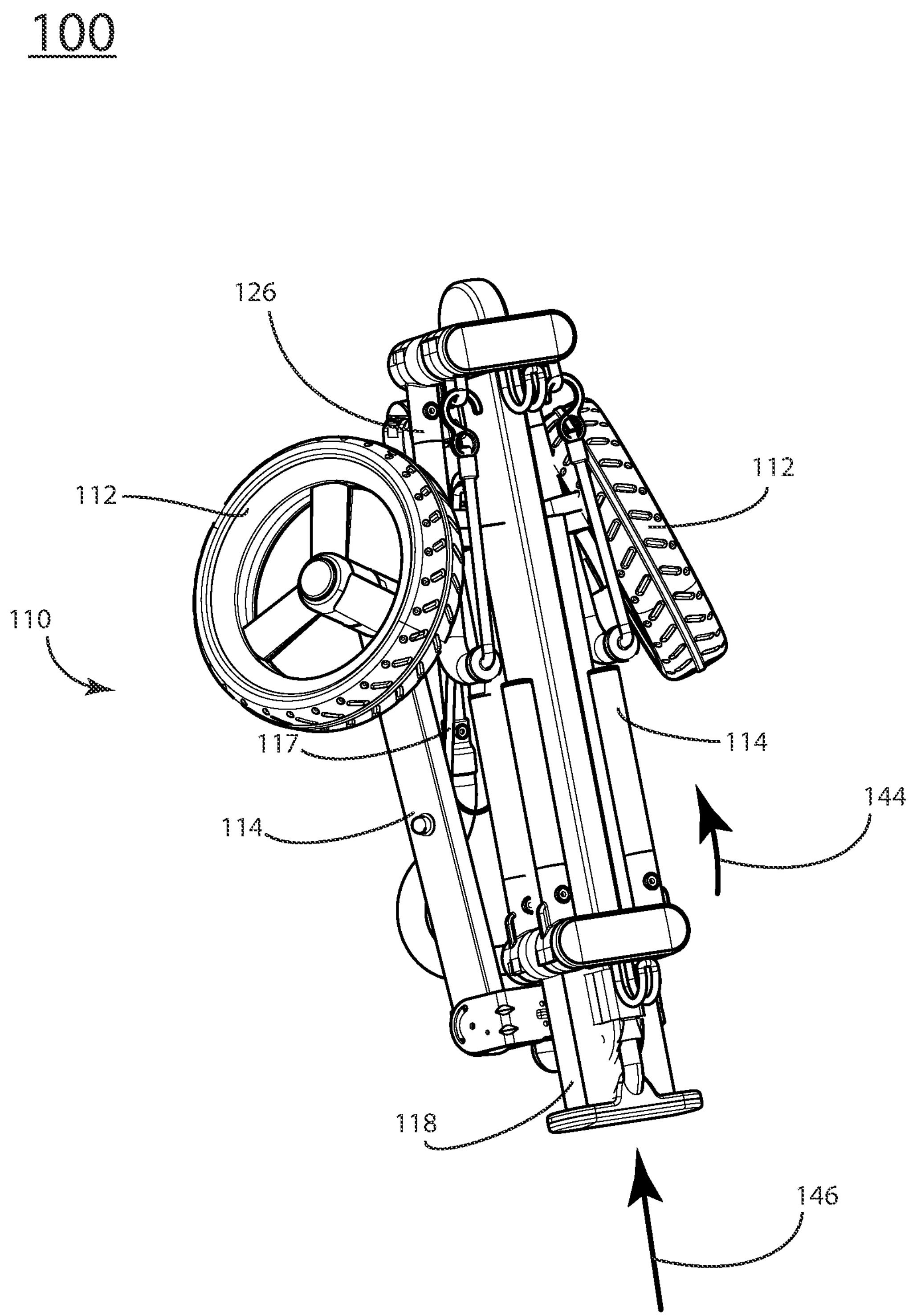
FIG. 8 is a perspective view of the embodiment in a folded configuration.

FIG. 8 shows a fully folded cart. Upper horizontal support structures 126 fold downward against the central structure 116. One skilled in the art understands that structures such as upper horizontal support structures 126 and lower paired braces 122/123 may be spring-loaded by a torsion spring 162 (FIG. 7), so as to remain in a closed position. As the lower sliding support 118 is slid upward in the direction of arrow 146, the linkage arms 117 pivot (as described in FIG. 5 description) to fold struts 114 such that wheels 112 and struts 114 become collapsed against the central structure 116. The folding handle 125 collapses to complete the folding of the cart 110. One skilled in the art understands that wheels 112 may snap off of the struts 114 for further compacting the product for storage.

Figure 9:
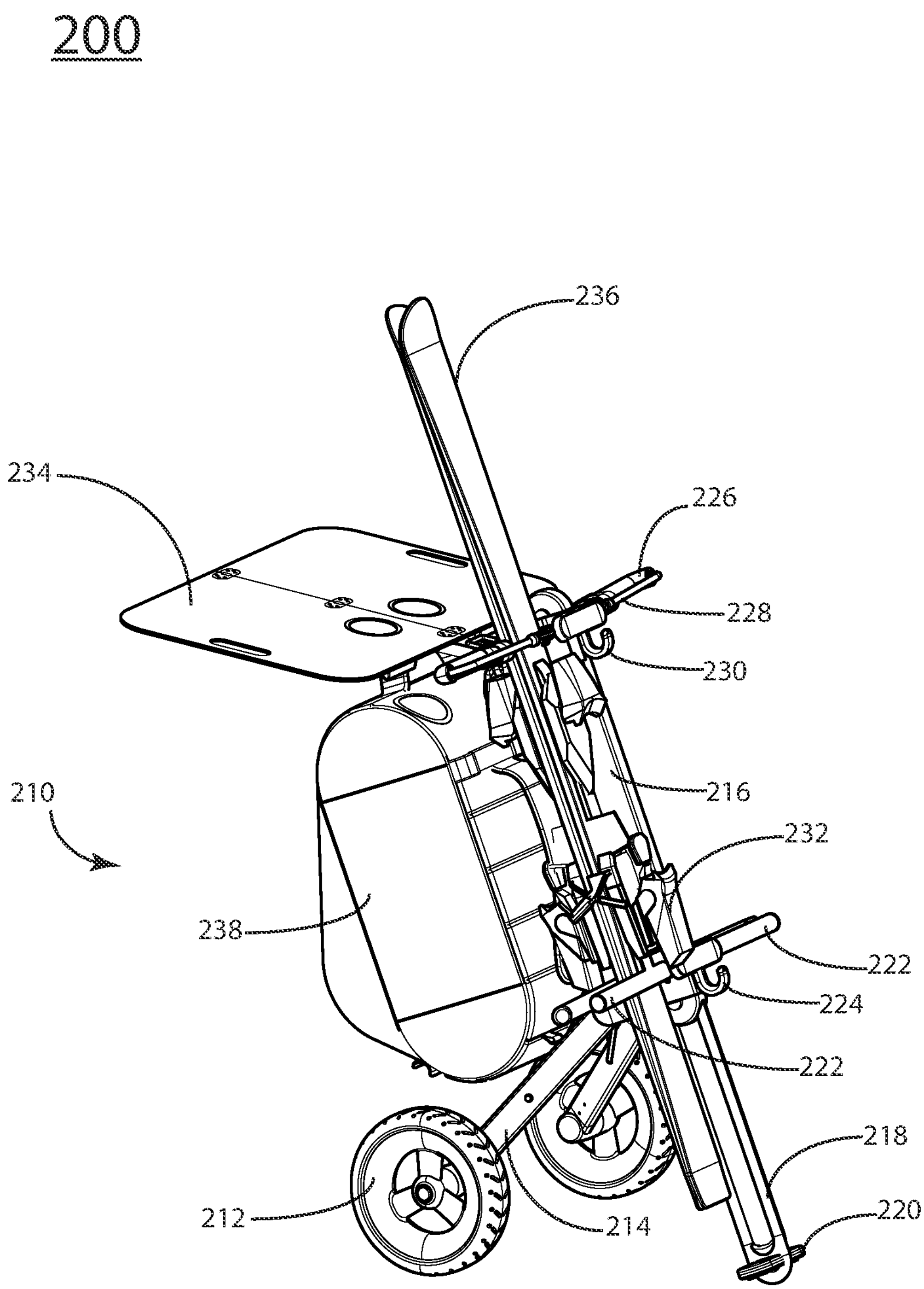
FIG. 9 is a perspective view of an iteration of the embodiment.
Figure 10:
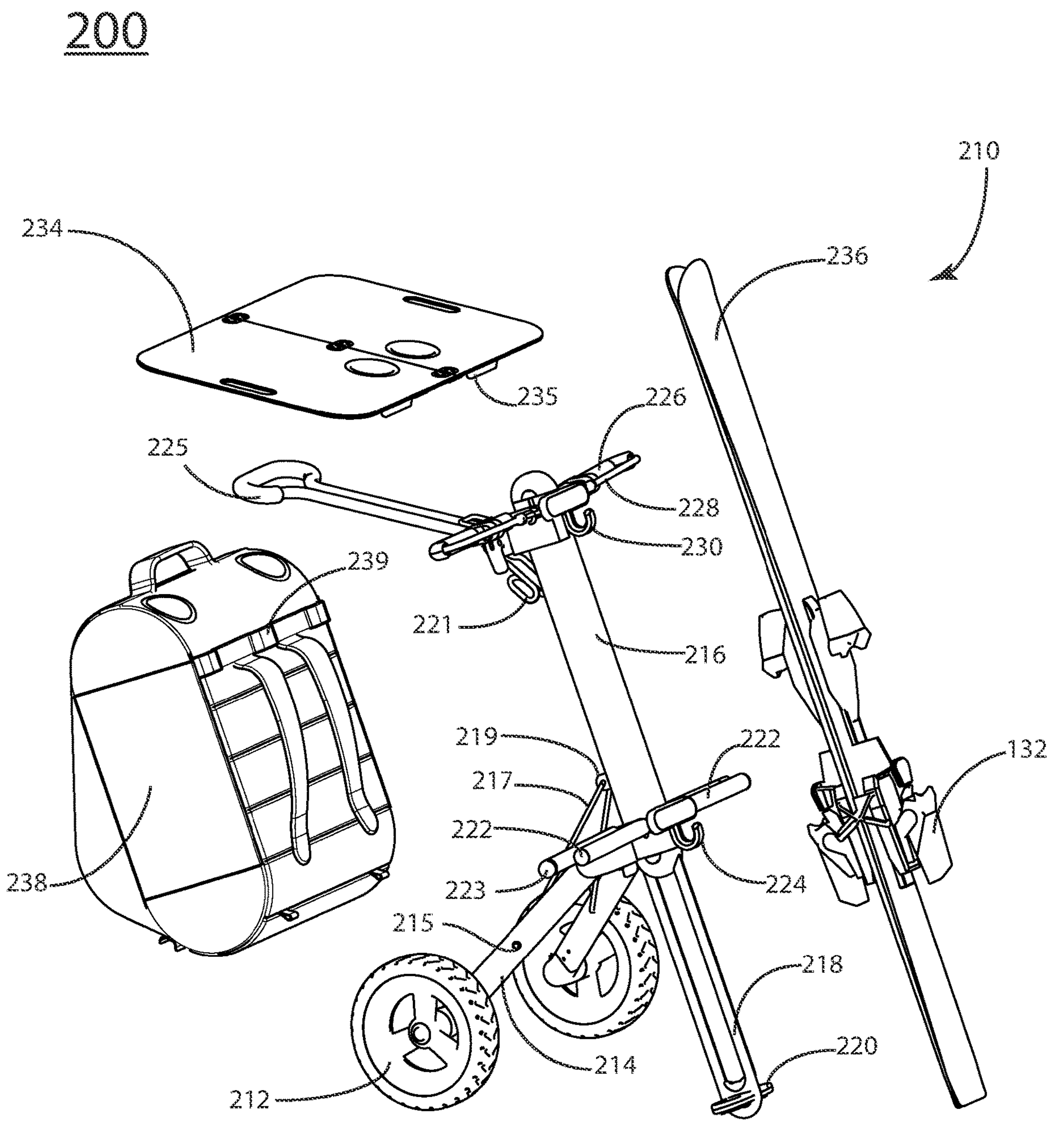
FIG. 10 is a partially exploded view of the embodiment of FIG. 9.
Figure 11:
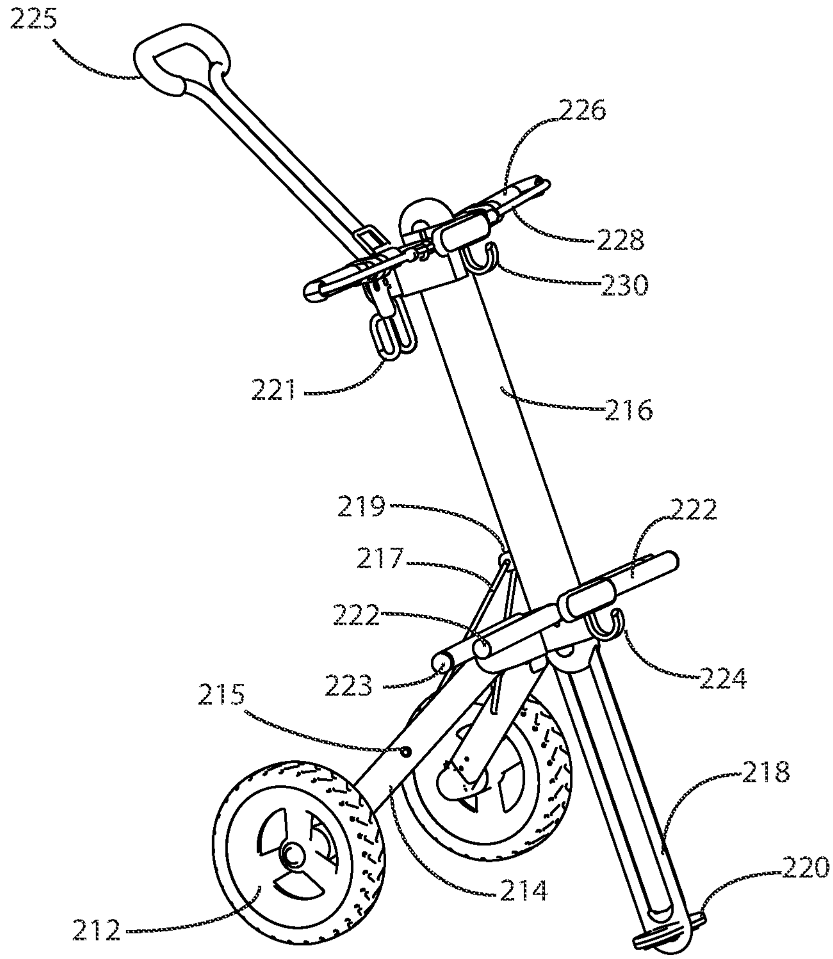
FIG. 11 is a front perspective view thereof.

FIGS. 9, 10 and 11 show perspective views of an iteration of the embodiment 200. A cart 210 is configured to carry a number of sets of skis 236 and to support a gear bag 238 for holding boots and other sports gear, and further to support a tray 234. A set of skis 236 is shown for demonstration purposes; one skilled in the art understands that ski poles, skis or snowboards may be carried in the same manner as a set of skis. In the example embodiment ski bindings 232 rest against paired lower horizontal structures 222 and 223 when carried on the cart 210.

A cart 210 has a hollow central support structure 216 that receives a sliding lower sliding support 218. The central support structure 216 has upper horizontal support structures 226 and paired lower horizontal structures (also referred to as ski braces) 222 and 223.

The ski braces comprise a front 222 and rear brace 223 and are joined where they meet the central support structure 216 (FIG. 6). The central support structure 216 has at its distal end a folding handle 225, a rearward bag-hook 221, a forward upper hook 230 and a forward lower hook 224 (FIG. 10). The rearward bag-hook 221 is configured to carry a gear bag 238 by fastening a strap loop 239 to the rearward hook 221. The tray 234 rests on the folding handle 225 as shown in FIGS. 8 and 9 and is further joined to the cart 1210 by stabilizing clips 235. One skilled in the art is familiar with stabilizing clips, tabs and the like.

Wheels 212 are connected to struts 214 which pivot about the central structure 216. Struts are connected to support-linkage arms 217 which pivot at a support-linkage pivot point 215. Another linkage pivot 219 is affixed to lower sliding support 218. The lower sliding support slides into the central structure 216. A stop 220 is disposed at the proximal end of the lower sliding support 218.

A lower sliding support 218 moves within the central structure 216 as it moves support-linkage arms 217 to cause struts 214 to fold against the central structure 216.

Figure 12:
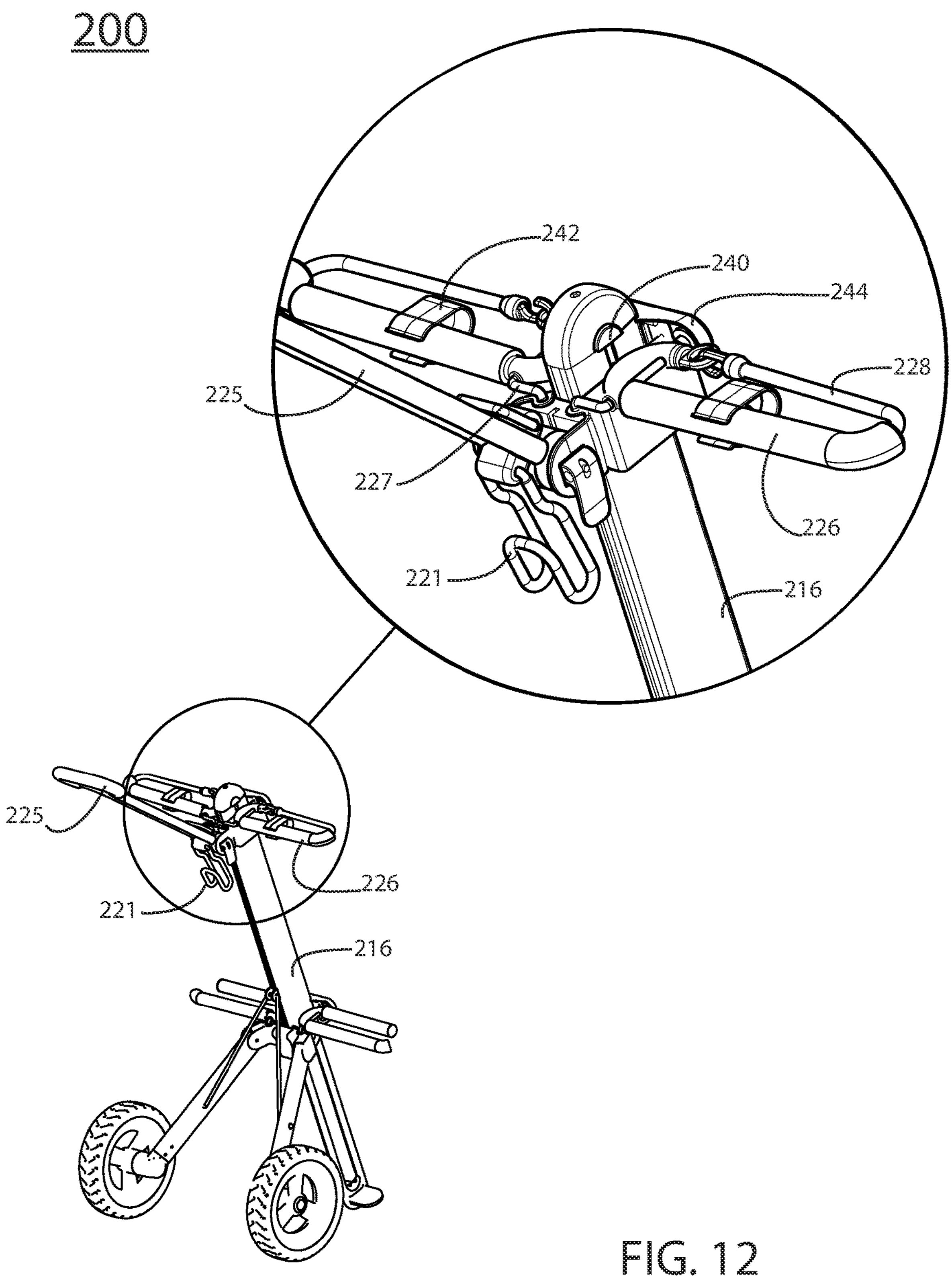
FIG. 12 is a perspective, detail view of the upper assembly thereof.

FIG. 12 shows the upper assembly in detailed view. The central structure 216 supports upper linkage members 227 that are held fast to the central support by a fixture 244. Upper horizontal support structures 226 pivot about the upper linkage members 227 for folding (FIG. 15). Elastic cords 228 hold the upper portion of skis 236 (FIG. 8) against the upper horizontal support structures 226. The rearward hook 221 is joined to the folding arm 225. One skilled in the art is familiar with fixtures and brackets that affix to the end of formed tubing such as that which makes up folding handle 225, for the purpose of finishing ends and joining hardware and other features such as rearward hook 221, to the formed tubing. Spacers 242 (FIG. 12) provide a means of keeping skis separated during transport. A release button 240 (FIG. 12) releases the upper horizontal support structures 226 for folding. The detailed features and function of the release button 240 is depicted in FIG. 14.

Figure 13:
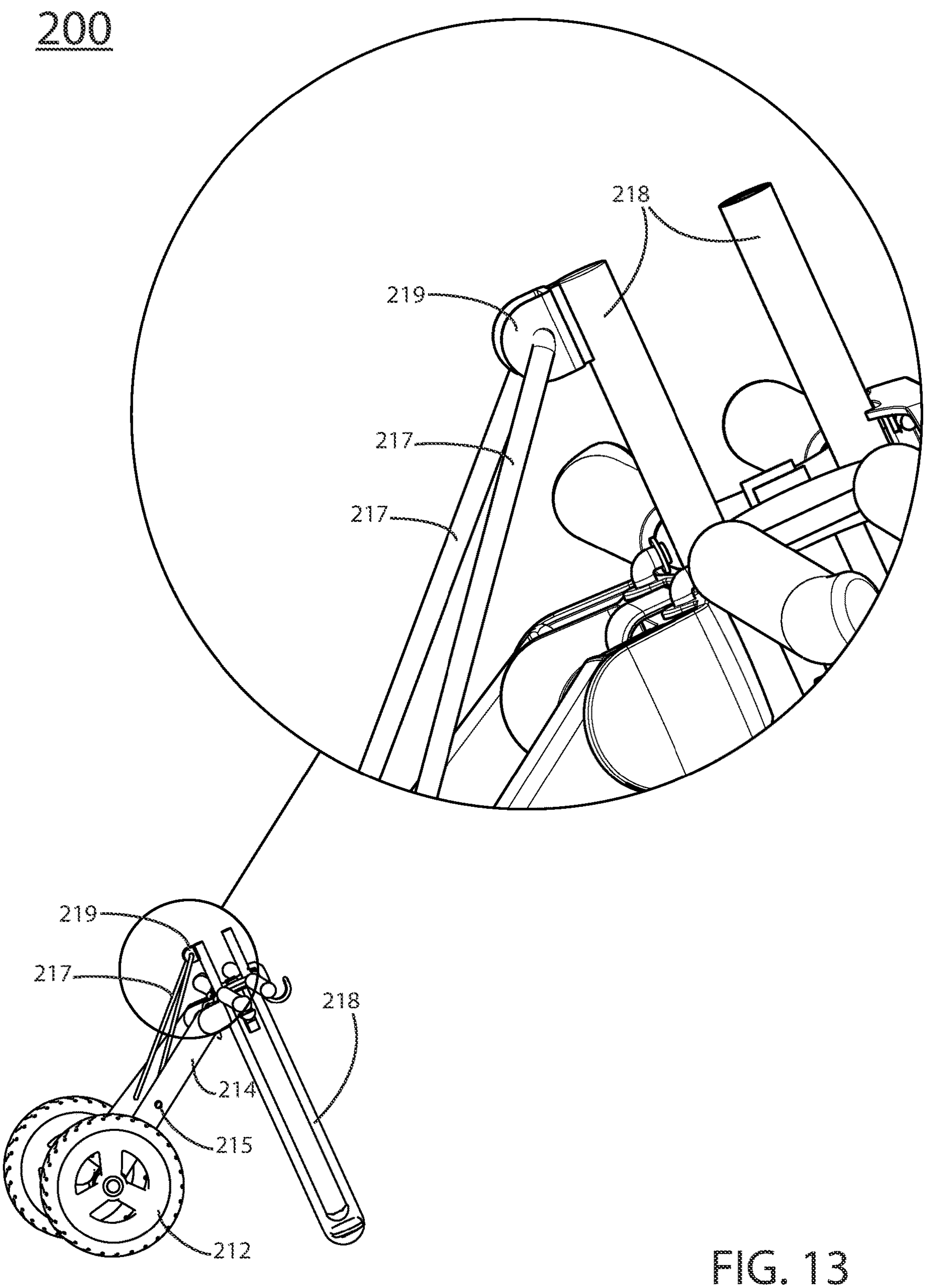
FIG. 13 is a perspective, detail view of the lower assembly thereof.

FIG. 13 shows a partial lower assembly in detail view. The lower sliding support 218 slides into the central structure 216 (not shown in FIG. 13 for clarity). Support-linkage arms 217 pivot in linkage pivot 219 which is in turn affixed to lower sliding support 218 and is further joined to struts 214 that support wheels 212 at a support linkage pivot point

215. As with the upper section, sliding the lower sliding support 218 into the central structure 216 (FIG. 12) moves support-linkage arms 217 to cause struts 214 to fold against the central structure 216.

Figure 14:
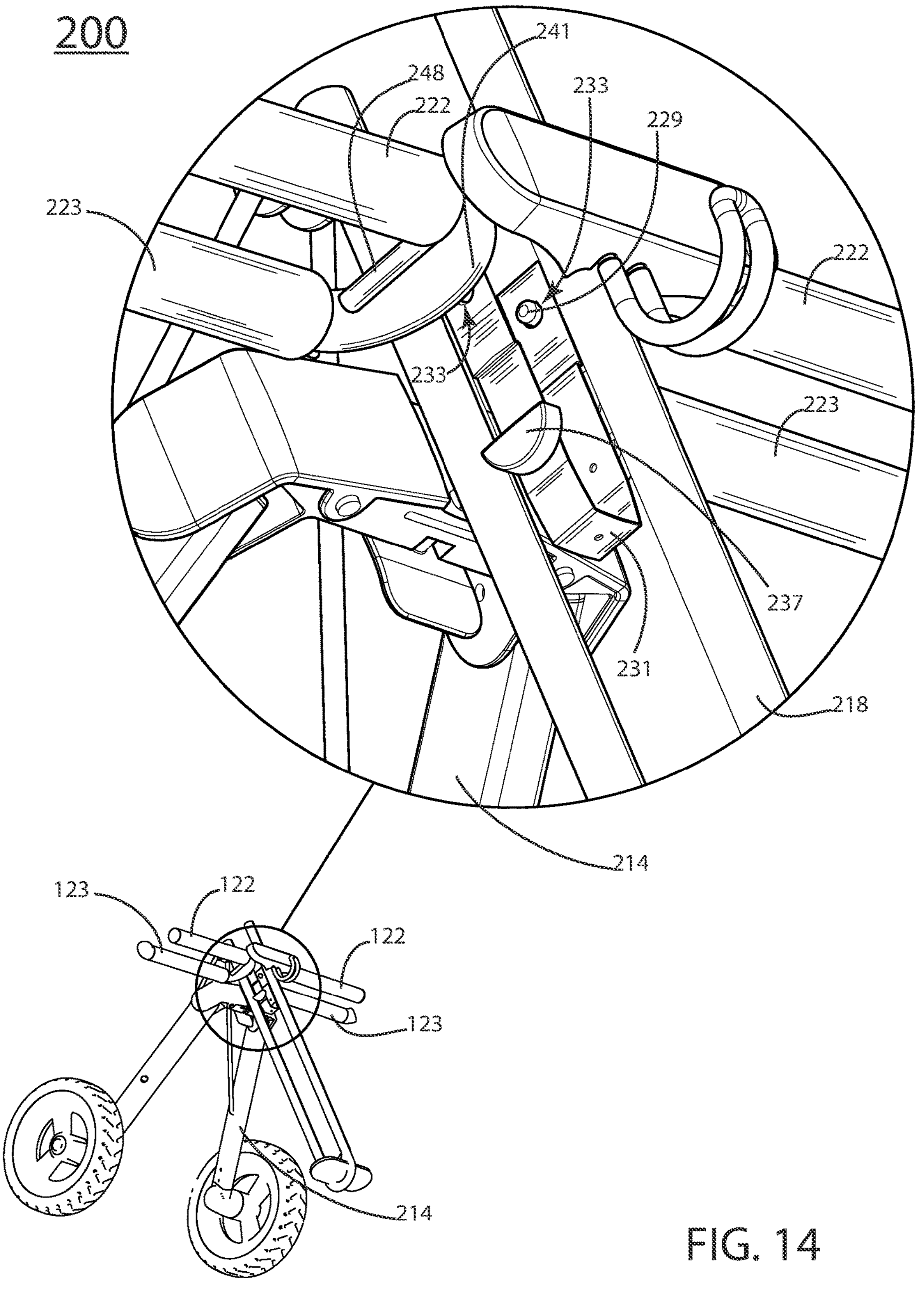
FIG. 14 is another perspective, detail view of the lower assembly thereof.
Figure 15:
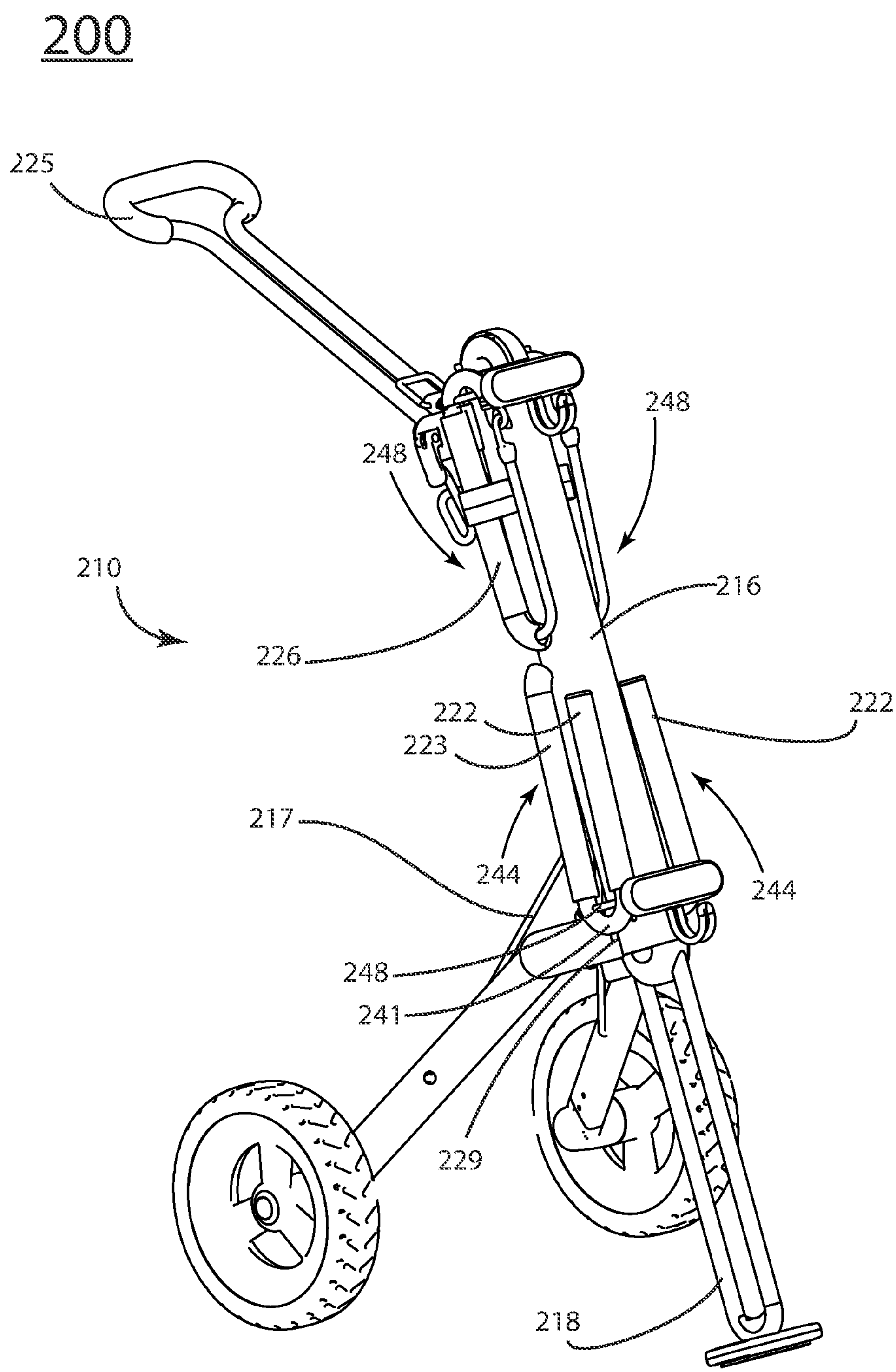
FIG. 15 is a perspective view thereof, partially folded.

FIG. 14 shows the release button feature in a detailed, partial-assembly view. The upper release button 240 (FIG. 12) and lower release button 237 have similar features and functions. For clarity, the central structure 216 (FIG. 9) is not shown in the partial assembly of FIG. 14. Struts 214 and lower sliding supports 218 are numbered for reference.

The paired lower supports, made up of rear brace 223 and front brace 222, are joined at a U-junction 241 which has a post-and-detent catch 229 in the release mechanism 231. The paired lower supports 222/223 pivot about shaft 248. The release mechanism is generally symmetrical. Release buttons 237 are affixed to both sides of the release mechanism 231. One skilled in the art understands such release mechanisms. When a release button 237 is depressed, the release mechanism 231 flexes sufficiently to release the post from the detent 233, allowing the paired braces 222/223 to pivot about shaft 248 to fold alongside the central structure 216 (FIG. 15).

Figure 16:
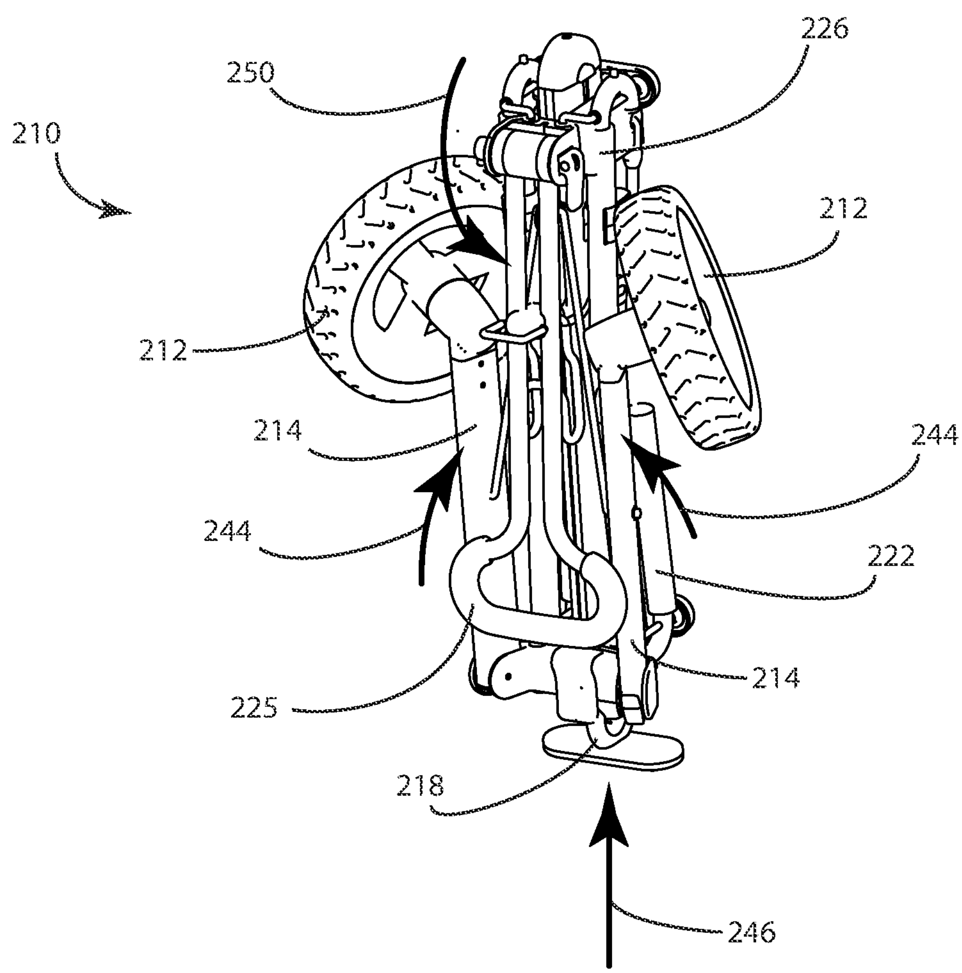
FIG. 16 is a perspective view thereof, fully folded.

FIGS. 15 and 16 show a partially folded cart 210; FIG. 15 is in perspective view and FIG. 16 shows a fully folded cart. Upper horizontal support structures 226 fold downward as shown by arrows 250 against the central structure 216. When post 229 is released from the detent, paired braces 222/223 pivot about shaft 248 and fold, in the direction shown by arrows 244, alongside central structure 216. One skilled in the art understands that structures such as upper horizontal support structures 226 and lower paired braces 222/223 may be spring-loaded to remain in a closed position as shown in FIGS. 15 and 16. As the lower sliding support 218 is slid upward (arrow 246), the linkage arms 217 pivot (as described in FIG. 13 description) to fold struts 214 such that wheels 212 and struts 214 collapse against the central structure 216. The folding handle 225 collapses in the direction of arrow 250 to complete the folding of the cart 210. One skilled in the art understands that wheels 212 may snap off the struts 214 for further compacting the product for storage.

The invention claimed is:

1. An apparatus for transporting sporting equipment comprising:

a central structure configured to removably engage with sporting equipment, having an upper end and a lower end; and at least one handle pivotally engaged with said central structure upper end; and a lower support slidably engaged with said central structure lower end; and a linkage pivot fixedly engaged with said lower support and slidably engaged with said central structure; and at least one strut pivotally engaged at a first end with said central structure lower end, and rotationally engaged at a second end with at least one wheel; and at least one linkage arm pivotally engaged at a first end with said linkage pivot; and pivotally engaged at a second end with said at least one strut; wherein said apparatus collapses as said lower support is slid along and into said central structure, thus sliding said linkage pivot, and said at least one linkage arm moves said at least one strut against said central structure to collapse the apparatus; the apparatus is unfolded as said lower support is slid along and out of said central structure.

2. The apparatus of claim 1 further comprising:

at least one horizontal structure pivotally engaged with said central structure upper end; and at least one pair of horizontal structures pivotally engaged with said central structure lower end; wherein said at least one horizontal structure and said at least one pair of horizontal structures pivot to fold against said central structure; and at least one piece of sporting equipment supported by said at least one horizontal structure and said at least one pair of horizontal structures may be wheeled about and maneuvered by said at least one handle when said apparatus is unfolded.

3. The apparatus of claim 2 further comprising:

said at least one horizontal structure pivotally engaged with said central structure upper end by way of a locking pivot mechanism, the locking pivot mechanism comprising:

a release button slidably engaged with a first fixture, which is in turn fixedly engaged with said at least one horizontal structure; and a second fixture having a first cogged receptacle, a splined receptacle and a second cogged receptacle and a third fixture fixedly engaged with at least a second horizontal structure; and having a cogged receptacle and a splined receptacle; and a housing; and said first fixture having a cogged receptacle and a splined end slidably engaged with said splined receptacle in said third fixture; and a first gear slidably engaged with said cogged receptacle in said first fixture and slidably engaged with said first cogged receptacle in said second fixture; and a second gear fixedly engaged with said first gear and slidably engaged with said second cogged receptacle in said second fixture; and slidably engaged with said third fixture cogged receptacle; and a torsion spring fixedly engaged with said third fixture at a first end and fixedly engaged with said housing at a second end; wherein activation of said release button moves said first and second gear free from said respective cogged receptacles, allowing rotation of said first and second horizontal structures, and releasing tension in said torsion spring.

4. The apparatus of claim 1 further comprising:

a tray removably engaged with said at least one handle; wherein said at least one handle pivoted to a horizontal position supports said tray in a horizontal position for use as a tray table.

5. The apparatus of claim 1 further comprising:

at least one forward hook fixedly engaged with a forward portion of said central structure; and at least one rearward hook fixedly engaged with a rearward portion of said central structure; wherein sports equipment may be removably engaged with said forward and rear hooks to balance the apparatus.

6. The apparatus of claim 5 further comprising:

at least one bag configured to hold sporting equipment and to engage with said at least one rear hook.

7. An apparatus for transporting ski equipment comprising:

a central structure having an upper end and a lower end; and at least one handle pivotally engaged with said central structure upper end; and at least one horizontal structure pivotally engaged with said central structure upper end; and at least one pair of horizontal structures pivotally engaged with said central structure lower end; and a lower support slidably engaged with said central structure lower end; and a linkage pivot fixedly engaged with said lower support and slidably engaged with said central structure; and at least one strut pivotally engaged at a first end with said central structure lower end, and rotationally engaged at a second end with at least one wheel; and at least one linkage arm pivotally engaged at a first end with said linkage pivot; and pivotally engaged at a second end with said at least one strut; and at least one wheel rotationally engaged with a second end of said at least one strut;

wherein at least one piece of sporting equipment, supported by said at least one horizontal structure and said at least one pair of horizontal structures, may be wheeled about and maneuvered by said at least one handle; said apparatus collapses as said at least one horizontal structure and said at least one pair of horizontal structures pivot to fold against said central structure; and said lower support slides along said central structure, thus sliding said linkage pivot; said at least one linkage arm and said at least one strut move against said central structure to collapse the apparatus, and the apparatus is unfolded as said lower support is slid along and out of said central structure.

* * * * *